(12) United States Patent
Gwen

(10) Patent No.: US 11,827,531 B1
(45) Date of Patent: Nov. 28, 2023

(54) WATER FILTER SYSTEM FOR DOMESTIC AND COMMERCIAL USE

(71) Applicant: CORE PACIFIC INC., Houston, TX (US)

(72) Inventor: Patrick Gwen, Houston, TX (US)

(*) Notice: Subject to any disclaimer, the term of this patent is extended or adjusted under 35 U.S.C. 154(b) by 0 days.

(21) Appl. No.: 17/815,347

(22) Filed: Jul. 27, 2022

(51) Int. Cl.
*C02F 1/00* (2023.01)

(52) U.S. Cl.
CPC ........ *C02F 1/001* (2013.01); *C02F 2201/004* (2013.01); *C02F 2201/006* (2013.01)

(58) Field of Classification Search
CPC .... B01D 29/56; B01D 35/30; B01D 2201/30; B01D 2201/301; B01D 2201/165; C02F 9/005
See application file for complete search history.

(56) References Cited

U.S. PATENT DOCUMENTS

| | | | | |
|---|---|---|---|---|
| 1,965,999 | A * | 7/1934 | Beatty | B01D 25/343 210/331 |
| 4,681,677 | A * | 7/1987 | Kuh | B01D 35/153 210/111 |
| 5,328,609 | A | 7/1994 | Magnusson | |
| 5,342,519 | A | 8/1994 | Friedmann | |
| 5,407,571 | A | 4/1995 | Rothwell | |
| 6,360,764 | B1 | 3/2002 | Fritze | |
| 2005/0045552 | A1 | 3/2005 | Tadlock | |
| 2006/0186026 | A1 | 8/2006 | Saleh | |
| 2007/0000833 | A1 | 1/2007 | Levy | |
| 2007/0158263 | A1 * | 7/2007 | Brandt | B01D 29/96 210/437 |
| 2009/0308799 | A1 * | 12/2009 | Cho | B01D 35/301 210/232 |
| 2010/0065484 | A1 * | 3/2010 | Bruggink | C02F 9/005 210/232 |
| 2015/0344321 | A1 | 12/2015 | Allsip | |
| 2018/0065068 | A1 * | 3/2018 | Lee | C02F 1/48 |
| 2018/0127294 | A1 * | 5/2018 | Zhang | C02F 9/00 |
| 2019/0282938 | A1 | 9/2019 | Fiox | |

* cited by examiner

*Primary Examiner* — Benjamin M Kurtz

(57) ABSTRACT

A water filter system has a housing with the channel formed adjacent a bottom thereof and at least one chamber formed therein, and at least one filter removably received in the chamber. The channel is adapted to connect with a water inlet line. The channel is also adapted to connect with a water outlet line. The filter is in communication with the channel at a bottom thereof. The filter and an inner wall of the chamber define an annulus therebetween. The filter has an interior passageway that opens to a filter media. The filter media is disposed such that water flows from the channel and into the interior passageway, through the filter media, and into the annulus. The annulus then communicates with the channel.

1 Claim, 8 Drawing Sheets

WATER FILTER SYSTEM FOR DOMESTIC AND COMMERCIAL USE

CROSS-REFERENCE TO RELATED APPLICATIONS

Not applicable.

BACKGROUND OF THE INVENTION

1. Field of the Invention

The present invention relates to systems for filtering domestic and commercial water supplies. More particularly, the present invention relates to canister-type filter systems wherein a filter is removably received within a housing. Furthermore, the present invention relates to water filter systems in which the filter is replaceably positioned within the canister.

2. Description of Related Art Including Information Disclosed Under 37 CFR 1.97 And 37 CFR 1.98

Domestic purification of drinking water at the point-of-use is becoming increasingly important to many consumers. Water is usually purified to one extent or another by most municipalities prior to being supplied to consumers. Such municipal purification systems are, however, often inadequate and incapable of removing many contaminants which adversely affect the taste of drinking water and which are introduced into drinking water between the municipal purification site and the domestic residences being serviced by the municipality.

Some of the existing problems in the art regarding filtration systems involve filter replacement compliance, filter retention during operation, modularity, and modification of system components to establish series or parallel flow to accommodate different filtration schemes.

There remains a demand in industry in commercial and domestic settings for filter systems that can be used in diverse applications and which can be assembled in modular form to achieve specific and specialized filtration needs. It is desirable for such filter systems to be adaptable for various filtering needs and filtering capacities. Furthermore, a filter system installed on a supply line will generally require routine maintenance for cartridge replacement and/or manifold repair. A modular system capable of detachment and reassembly allows a user to perform replacement and/or repair without the need to remove the entire filter assembly.

Many applications require that more than one filter be employed to selectively remove different impurities. A filtration system may require the application of reverse osmosis membrane filters as well as other specialty filters that require pre-removal of contaminants, such as chlorine and/or sediment, in order to operate efficiently and properly. In such situations, some contaminants may first be removed from the feed water by passing the fluid through an upstream pre-filter before the fluid is fed into a filter array positioned downstream. The subsequent treatment of fluids through multiple filters is known to have an effect on the quality of the filtered water as it passes through the filtering system. Both the number of filters and the type of filter media contained in the filters can affect the amount and type of contaminants removed from a treated water. Accordingly, it is desirable to provide a filtering system in which the number of individual filter cartridges, the type of filter media, and the particular configuration of the filtering system can be readily assembled and implemented in-line. It is important to note, however, that filter removal and replacement often requires significantly more attention and work when the filtration system uses different types of filters for filtering different substances from the fluids. Thus, a modular filtration system that can readily accommodate the assembly/disassembly of various filter cartridges is desirable.

FIG. 1 shows one type of prior art modular filter system 1. This modular filter system 1 includes a plurality of filter canisters 2, 3 and 4. Each of the filter canisters will contain filters 5, 6 and 7, respectively, therein. A channel 8 on top of the canisters 2, 3 and 4 and has an inlet 9 and an outlet 10. The channel 8 extends between each of the canisters 2, 3 and 4 so as to fill in each of the canisters 2, 3 and 4 with the water to be treated. As the water flows through the filter system 1, the water is treated by the filters 5, 6 and 7 in each of the respective canisters 2, 3 and 4. Ultimately, water will enter the filter system 1 through inlet 9 and flow downwardly into canister 2 so as to be treated by filter 5. The water will rise within the canister 2 and then pass into the channel 8 and move toward the canister 3 in order to be treated by filter 6. Water will then rise within the canister 3 and flow through the channel 8 to the canister 4 in order to be treated by the filter 7. Ultimately, the water will rise within the canister 4 and be released through the outlet 10. The step of rising and flowing are carried out on a continuous manner as the water is treated.

The canisters 2, 3 and 4 have respective caps 11, 12 and 13. In order to access each of the filters 5, 6 and 7 in the respective canisters 2, 3 and 4, the respective caps 11, 12 and 13 must be unscrewed so that the interior of each of the canisters 2, 3 and 4 is accessible. The person carrying out maintenance and replacement will then reach into at least one of the canisters 2, 3 and 4 so as to remove at least one of the filters 5, 6 and 7 therefrom. A replacement filter can then be inserted thereinto.

Ultimately, the water filter system 1, as shown in FIG. 1, has many problems. The system has a relatively bulky assembly. It is quite difficult to change the filters. Since each of the canisters 2, 3 and 4 contain water, the canisters 2, 3 and 4 are relatively heavy. Also, since the filters 5, 6 and 7 within the respective canisters 2, 3 and 4 will contain a certain amount of water, they are quite heavy and difficult to lift. Since each of the caps 11, 12 and 13 is screwed onto the respective canisters 2, 3 and 4, a great deal of torque must be applied to each of the caps 11, 12 and 13 so as to effectively seal the interior of the canisters 2, 3 and 4. Since the canisters 2, 3 and 4 are under a certain amount of pressure (between 40 p.s.i. and 150 p.s.i.), the seal between the caps 11, 12 and 13 and the respective canisters 2, 3 and 4 must be air-tight. As such, it is often necessary to employ a wrenche in order to screw each of the caps 11, 12 and 13 into a proper sealing position. This extra torque is necessary in order to assure the proper compression of the seals between the canisters 2, 3 and 4 and the respective caps 11, 12 and 13. The water filter system 1, shown in FIG. 1, has a relatively large footprint. Since the outlet 10 is at the top of the canisters 2, 3 and 4, it is difficult to empty water from the interior of the canisters 2, 3 and 4. Ultimately, the water filter system 1 can have leakage if the caps 11, 12 and 13 are not properly installed. Typically, each of the caps 11, 12 and 13 must have very fine threads in order to establish a proper seal. As such, it takes a large number of rotation to close the cap onto the cannister.

In past, various patents and patent application publications have been published with respect to such water filter systems. For example, U.S. Pat. No. 5,328,609, issued on Jul. 12, 1994 to Magnusson et al., describes a multi-stage radial flow filtration system. This system includes a disposable filter cartridge having first and second radial flow filtration stages containing filtration media of uniform porosity. A first stage includes a pair of annular, concentrically mounted, fibrous sediment and cast carbonaceous filter media. A second stage includes an annular cast carbonaceous filter media. Porous stage separators sequentially direct liquid flow into cavity spaces between the side walls of each stage and a liquid impermeable housing where the flow is radially redirected inward toward a center outlet bore. The first stage filters suspended sediments, lead and other heavy metals. The second stage removes suspended bacteria, parasites, volatile organic contaminants, herbicides, pesticides, industrial and agricultural contaminants, and the like. Various cartridge constructions have alternating O-ring sealed and caps.

U.S. Pat. No. 5,342,519, issued on Aug. 30, 1994 to Friedmann et al., describes a fluid filter cartridge with replaceable filter element. This is a spin-on fluid filter cartridge having a replaceable filter element which has an housing, an internally threaded annular collar, a replaceable filter element, and an externally threaded mounting head assembly. The annular collar is secured inside the housing ant its open upper end. A sealing ring and an annular channel adjacent the external threads of the mounting head seals the cartridge when the mounting head assembly is threaded onto the annular collar.

U.S. Pat. No. 5,407,571, issued on Apr. 18, 1995 to C. N. Rothwell, provides a filter unit for a modular filter assembly that comprises a head having a feed chamber and a discharge chamber, and a casing surrounding a filter element. Fluid flow from the feed chamber to the discharge chamber of the filter unit passes through the filter element. The head is provided with a first inlet opening and a first outlet opening which communicates with the feed chamber. The head is provided with a second inlet opening and a second outlet opening which communicate with the discharge chamber.

U.S. Pat. No. 6,360,764, issued on Mar. 26, 2002 to K. Fritze, shows a cartridge adapter for use in mating a filter cartridge to a filter manifold. This adapter assembly includes an adapter body having a manifold coupler and a cartridge coupler. The manifold coupler is for mating with the filter manifold and has an inlet fluidly communicable with a filter manifold fluid inlet and a fluid outlet being fluidly communicable with a filter manifold fluid outlet. A sealing means isolates an inlet flow of unfiltered water from an outlet flow of filtered water. The cartridge coupler mates with the filter cartridge and has an inlet fluidly communicable with a filter cartridge and an outlet in fluid communication with the manifold coupler inlet and a fluid outlet being fluidly communicable with a filter cartridge outlet and in fluid communication with the manifold coupler outlet. At least one valve is disposed in the adapter body to control the flow of water therethrough.

U.S. Patent Application Publication No. 2005/0045552, published on Mar. 3, 2005 to J. W. Tadlock, describes a fluid a modular fluid treatment apparatus and method in which modules of the system can each have a head that can be connected to one or more heads in different configurations. The relationship between the cartridge of the module and its corresponding head prevents fluid from entering between the cartridge and an external shell of the module. The module has a head with a substantially concentric inlet and outlet ports in fluid communication with a cartridge coupled to the head.

U.S. Patent Application Publication No. 2006/0186026, published on Aug. 24, 2006 to M. K. Saleh, provides a compact water purification apparatus for purifying water from a municipal water supply prior to a point-of-use. This water purification apparatus has multiple water purification units that can include cartridge filters for removing chlorine, rust and sediment, heavy metals, dissolved iron, hydrogen sulfide, chloroform, and lead. An ultraviolet light source is also connected in series. A bypass conduit is connected in parallel with the water purification units.

U.S. Patent Application Publication No. 2007/0000833, published on Jan. 4, 2007 to Levy et al., discloses a model modular fluid purification system having a disposable sump assembly and an improved flow distribution plate. The system is adaptable to a variety of configurations without the need for re-piping or re-plumbing of the installation.

U.S. Patent Application Publication No. 2015/0344321, published on Dec. 3, 2015 to M. L. Allsip, teaches a water filter assembly including a first filter cartridge and a second filter cartridge mounted to a manifold. The first and second filter cartridges are plumbed into the manifold such that unfiltered water from an inlet of the manifold flows in parallel to the first and second filter cartridges. A third filter cartridge is also mounted to the manifold. The third filter cartridge is plumbed into the manifold such that the filtered water from the said first and second filter cartridges is directed into the third filter cartridge.

U.S. Patent Application Publication No. 2019/0282938, published on Sep. 19, 2019 to Fiox et al., discloses a modular filtration platform having at least one manifold head and at least one respective filter cartridge assembly. Each manifold head is connected to one another to establish a water flow in series or parallel. Each filter cartridge assembly is releasably secured from rotation relative to the manifold head by a locking mechanism. An aperture on the filter cartridge assembly's annular collar mates with a protruding resilient extension on either the manifold head or the support bracket. An integrated sensor package can be integrated with the system for true managed water visible/audible indications.

It is an object of the present invention to provide a water filter system that is relatively lightweight.

It is another object of the present invention to provide a water filter system that makes it easy to change filters.

It is another object of the present invention to provide a water filter system that has a reduced footprint.

It is another object of the present invention to provide a water filter system which makes it easy to empty water from the canisters or filters.

It is another object of the present invention to provide a water filter system that minimizes the amount of rotation and torque required in order to close and seal the outer caps on to the filters.

It is another object of the present invention to provide a water filter system that provides a simple technique for releasing air pressure from the interior of the system.

It is another object of the present invention to provide a water filter system which makes it easy to guide filter cartridges into a sealed connection with the water flow channel.

It is another object of the present invention to provide a water filter system that does not require the use of wrenches.

It is another object of the present invention to provide a water filter system that avoids the use of threads.

It is still another object of the present invention provide a water filter system that avoids leakage.

It is still another object of the present invention to provide a water filter system that is relatively easy-to-use, easy to manufacture and relatively inexpensive.

It is still a further object of the present invention to provide a monoblock for a water filter system in which all of the components are securely and fixedly configured together.

It is another object of the present invention to provide a cover member for attachment to a top of the water filter system which facilitates the ability for the outer cap to be secured within the water filter system in a reliable manner and with minimal effort.

These and other objects and advantages of the present invention will become apparent from a reading of the attached specification and appended claims.

BRIEF SUMMARY OF THE INVENTION

The present invention is a water filter system that comprises a housing having a channel formed adjacent a bottom thereof and at least one filter removably received in at least one chamber of the housing. The channel is adapted to connect with a water inlet line. The channel is adapted to also connect with a water outlet line. The filter is removably received within the chamber. The filter is in communication with the channel at the bottom of the filter. The filter and an inner wall of the chamber define an annulus therebetween. The filter has an interior passageway that opens to a filter media. The filter media is disposed such that water flows from the channel and into the interior passageway, through the filter media and into the annulus. The annulus then communicates with the channel.

The filter has a top cap affixed over an upper end thereof and a bottom cap affixed over a lower end thereof. The channel has a receptacle formed adjacent to the bottom of the housing. The bottom cap of the filter is received in the receptacle. The bottom, in particular, has a tubular member extending downwardly therefrom. This tubular member is received in the receptacle. Either the inner wall of the receptacle or the outer wall of the tubular member has an O-ring seal thereon. This O-ring seal forms a liquid-tight seal between the receptacle and the tubular member. The receptacle also has a funnel area at an upper end thereof. This funnel area is adapted to guide the tubular member into an interior of the receptacle.

The top cap of the filter has a handle hingedly mounted at the top thereof. This handle is movable between an outwardly extending position and a position laying flat against a surface of the top cap.

The housing has a cavity formed at an upper end of the chamber. An outer cap is releasably affixed within this cavity. The outer cap covers an upper end of the filter. The cavity has a plurality of ramps formed on an inner wall of the cavity so as to extend inwardly from the inner wall of the cavity. The outer cap has a plurality of arms extending outwardly of an outer surface thereof. The plurality of arms are engageable respectively with the plurality of ramps such that a rotation of the outer cap causes the outer cap to be fixedly engaged within the cavity of the housing. The outer cap has a handle extending upwardly from an upper surface thereof. The handle is adapted to be engaged by a human hand so as to cause the outer cap to rotate such that the plurality of arms respectively engage the plurality of ramps. The housing has a cover member affixed thereto. This cover member has the cavity formed therein.

The outer cap is movable between an open position and a locked position. The cover member has a slot formed at or adjacent to a top surface thereof. The outer cap has a handle with a length dimension extending for a distance greater than a diameter of the cavity. The handle has a portion received in the slot when the outer cap is in the locked position. The outer cap has a pressure relief valve affixed thereto or formed thereon. The pressure relief valve has a button positioned at the top surface of the outer cap. The outer cap has a spring urging against the underside of the button. The cap has a valve member slidably positioned therein. The button is depressable so as to overcome a resistance of the spring such that an underside of the button urges against and moves the valve member so as to release pressure from the interior of the housing. The outer cap also has at least one O-ring extending circumferentially therearound. This O-ring is interposed in liquid-tight sealing relationship between an exterior of the outer cap and an inner wall of the cavity. The cover member has an elastomeric O-ring seal formed between the bottom of the cover member and an upper surface of a top of the body of the housing.

In the preferred embodiment of the present invention, the chamber comprises three chambers. The filter comprises three filters. The three filters are respectively received in the three chambers.

A water inlet line is connected to one of the end of the channel of the housing. A water outlet line is connected to an opposite end of the channel of the housing. A discharge line is connected to the channel adjacent to the opposite end of the channel of the housing. A valve is cooperative with the water outlet line, with the channel, and with the discharge line. This valve is movable between a first position in which water flows from the channel into the water outlet line and a second position in which water from the channel is directed from the channel to the discharge line. A valve is affixed to the water inlet line. This valve is movable between a first position blocking water flow from entering the channel and a second position allowing water flow to enter the channel.

In an embodiment of the present invention, the chamber comprises at least a pair of chambers. The channel extends between the pair of chambers. A blocking element is disposed in the channel between the pair of chambers so as to direct water flow into the respective filters within the chambers.

The present invention is also a monoblock for a water filter system. This monoblock comprises a housing having a channel formed adjacent a bottom thereof. The channels adapted to be connected to a water inlet line. The housing has at least two chambers formed therein. Each of the chambers is adapted to receive a water filter therein. The channel is adapted to be connected with a water outlet line.

The present invention is also a cover member for attachment to a top of the water filter system. The cover member comprises a body having at least two cavities formed therein. The body is adapted to be affixed to a top of the water filter system. The body has at least two ramps formed on an inner wall of the cavities. Each of these ramps is adapted to receive a corresponding arm of an outer cap of a filter therein.

This foregoing Section is intended to describe, with particularity, the preferred embodiments of the present invention. It is understood that modifications to these preferred embodiments can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 1:
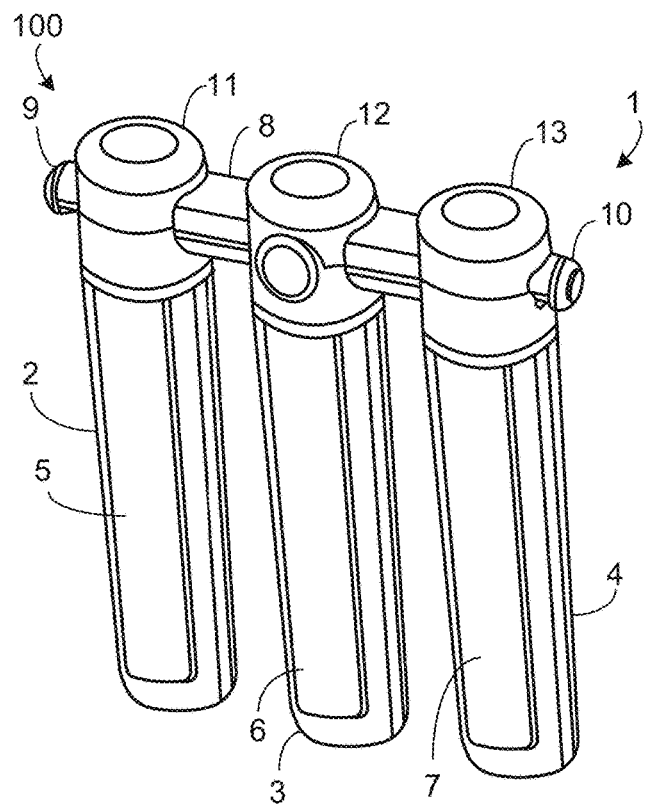
FIG. 1 is a perspective view of a prior art water filter system.
Figure 2:
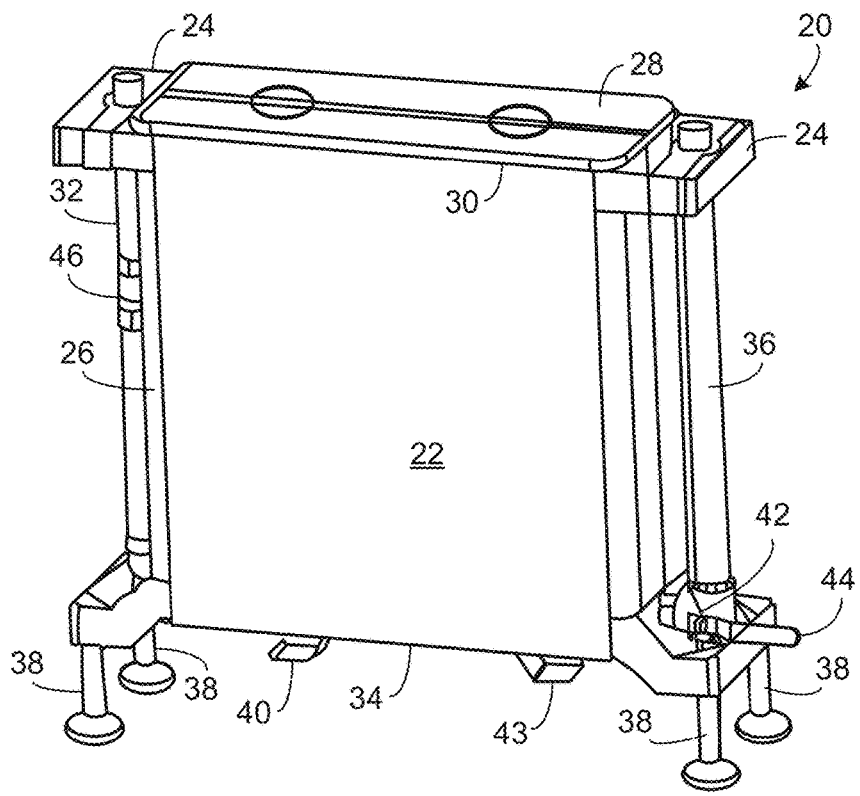
FIG. 2 is an upper perspective view of the water filter system in accordance with the preferred embodiment of the present invention.

Referring to FIG. 2, there is shown the water filter system 20 in accordance with the preferred embodiment of the present invention. The water filter system 20 includes a housing 22 having a cover member 24 at an upper end thereof and a body 26 affixed below the cover member 24. A dust cover 28 extends over the top 30 of the housing 22. A water inlet line 32 is positioned on one side of the housing 22 and extends downwardly toward the bottom 34 of housing 22. An upper end of the water inlet line 32 passes through an opening in the cover member 24. Water inlet line 32 is directed so as to pass water toward a channel located adjacent to the bottom 34 of the housing 22. A water outlet line 36 is located on the opposite side of the housing 22 from the water inlet line 32. The water outlet line 36 also has a portion that extends downwardly toward the bottom 34 of the housing 22. An upper end of the water outlet line 36 is received within an opening in the cover member 24.

The water filter system 20 of the present invention includes feet 38 that support the housing 34 above an underlying surface. Within the concept of the present invention, the feet 38 can be omitted and the housing 34 can be installed on an external surface or rest on an underlying surface. A pair of brackets 40 extend outwardly from the bottom 34 of the housing 22. Brackets 40 are adapted to receive a discharge line (to be described hereinafter). The brackets 40 are configured so that the discharge line can be conveniently wrapped around the brackets 40 and retained therein.

A valve 42 is positioned toward the bottom of the water outlet line 36. A valve arm 44 extends outwardly from the valve 42. In the preferred embodiment the present invention, the valve 42 is a three-way valve. As such, the valve arm 44 can be manipulated so as to allow for various flow directions of water through the water filter system 20. In one position, water will flow from the water inlet line 32, through the filters within the housing 22, and outwardly through the water outlet line 36. In another position, the water will flow through the water inlet line 32, through the filters in the housing 22, and outwardly through the discharge line. The water inlet line will also have another valve 46 thereon. Valve 46 is an open/close valve which either allows water flow to pass through the water inlet line 32 and then into the channel associated with the water filters on the interior of the housing 22 or to block water flow from the water inlet line 32 from entering the channel of the housing 22.

Figure 3:
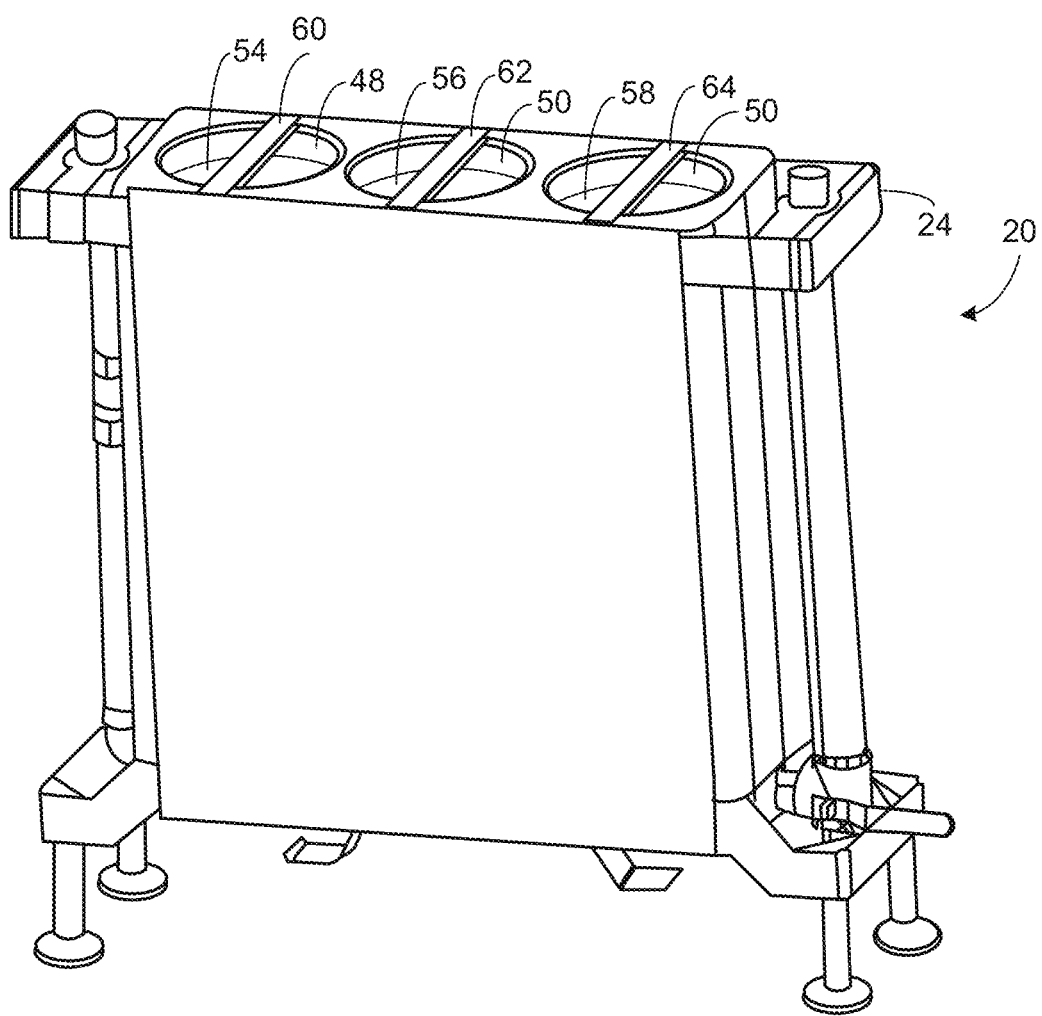
FIG. 3 is an upper perspective view of the water filter system of the present invention with the lid removed from the top of the water filter system.

FIG. 3 shows the water filter system 20 with the dust cover 28 removed. As can be seen, the cover member 24 has cavities 48, 50 and 52 exposed. Outer caps 54, 56 and 58 are located within the cavities 48, 50 and 52, respectively. Handles 60, 62 and 64 are illustrated as received in slots formed in diametrically opposite locations at the top of the cavities 48, 50 and 52. As such, this configuration locks the respective outer caps 54, 56 and 58 from further rotation and maintains the position of such outer caps 54, 56 and 58 within the respective cavities 48, 50 and 52.

Figure 4:
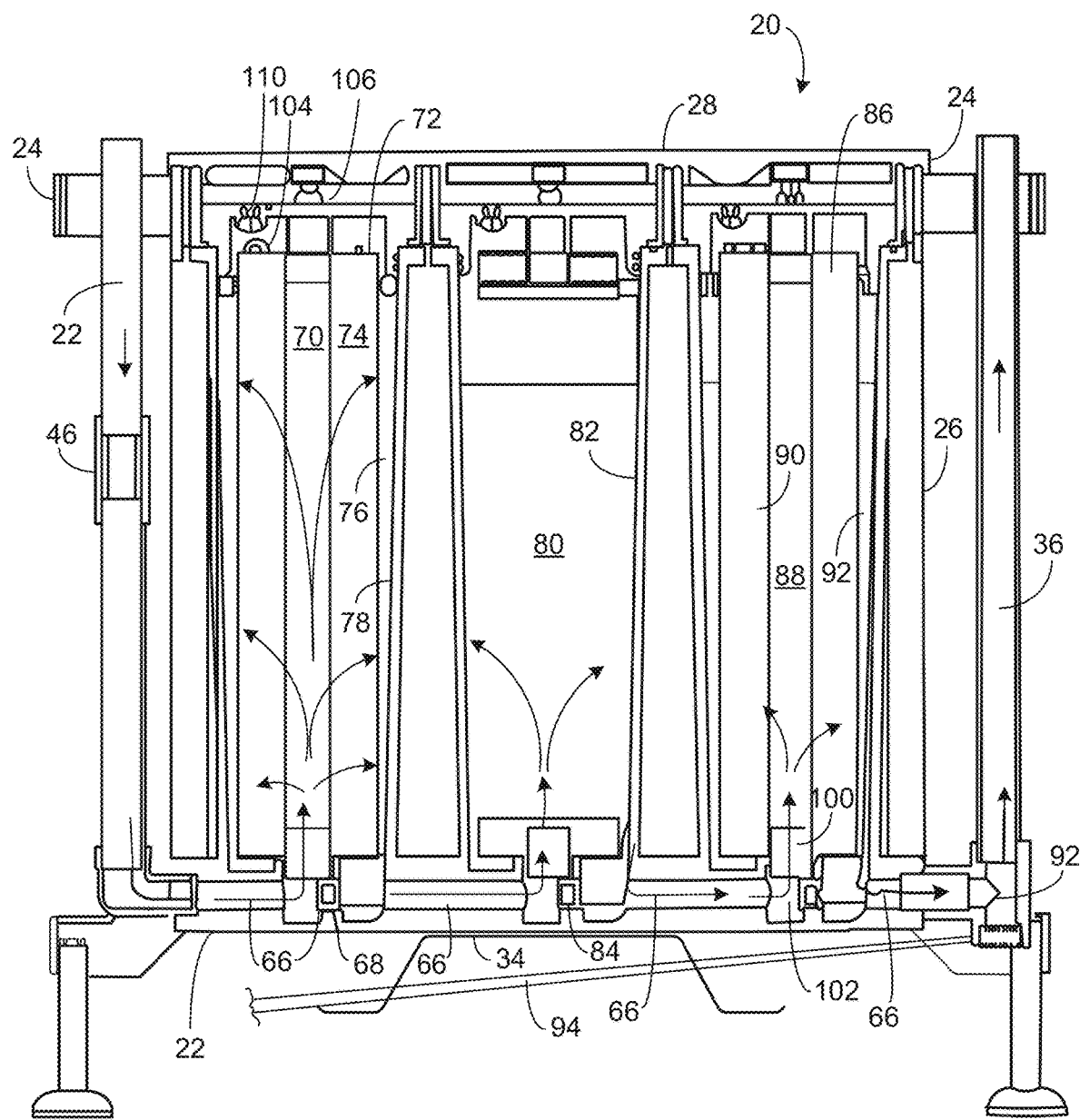
FIG. 4 is a cross-sectional side view of the water filter system of the present invention and showing, in particular, the flow of water within the system.

FIG. 4 shows an interior of the water filter system 20 of the present invention. In particular, FIG. 4 shows the interior of the housing 22. Initially, it can be seen that the water inlet line 32 is supported at the upper end by the cover member 24. The arrow within the water inlet line 32 is illustrated as flowing past the valve 46 so as to flow downwardly therein and ultimately enter a channel 66 at the bottom 34 of housing 22. The water will flow through the channel 66 and ultimately be blocked by blocking element 68. This causes the flow of water (indicated by the arrows) to flow upwardly within an interior passageway 70 of a filter 72. Filter 72 is a canister-type filter. Filter media 74 surrounds the interior passageway 70. As water flow is forced upwardly through the interior passageway 70, it flows outwardly through the filter media 74 and into the annulus 76 formed between an outer diameter of the filter media 74 and an inner wall of a chamber 78 formed within the housing 22. Once the water flow enters the annulus 76, the water will flow downwardly so as to enter the channel 66 and flow toward another chamber 80. Chamber 80 has the filter element omitted for the purposes of illustration. The water will pass through the filter media of the filter within the chamber 80 and flow toward the annulus 82 and then flow downwardly toward the channel 66 on an opposite side of blocking element 84. The water will then flow along the channel 66 so as to enter the bottom of another filter 86 and flow through the interior passageway 88 of filter 86, through the filter media 90 and into the annulus 92. From there, the water will flow downwardly so as to pass into the channel 66 at the bottom 34 of the housing 22 and flow outwardly toward the water outlet line 36. Valve 42 is disposed between the channel 66 and the water outlet line 36. The valve is adaptable so as to allow the water to flow through the water outlet line 36 or to cause the water to pass into a water discharge line 94.

Water discharge line is important in the present invention in that it allows water to be released from the interior of the housing 22 so as to minimize the weight of water within the housing and to facilitate the ability to remove each of the filters from the interior of the housing. As such, the water discharge line 94 will allow water to drain properly from the housing and be directed toward a sewer or other drainage location. The valve 42 can be manipulated so as to block water from passing to the water outlet line 36 such that the water from the water inlet line 32 can be used so as to flush the interior of the water filter system 20.

In the present invention, it is important to note that the body 26 of the housing 22 is of a monoblock construction. As such, it is integrally formed by injection molding techniques as a single solid structure. The various chambers are formed within the interior of the monoblock. The assembly of the system is completed by simply inserting the various filters into each of the respective chambers such that the bottom cap 98 of the respective filters has its tubular member 100 inserted into a receptacle 102 located at the bottom of each of the respective chambers. This causes each of the respective filters to communicate with the channel 66 in a desired manner. The special connection between the tubular member 102 and the channel 66 is illustrated, in particular, in FIG. 14.

In FIG. 4, it can be seen that each of the filters has a top cap 104. Top cap 104 is affixed over the upper end of each of the filters. An outer cap 106 will be installed over the top cap 104.

As can be seen in FIG. 4, there are a total of three filters that are utilized for the treatment of water. Less than three filters or greater than three filters can be employed within the concept of the present invention. If greater than three filters are necessary, then the housing should be formed with a corresponding number of chambers. Ultimately, the filter media used in each of the filters can be of types known in the art for the removal of chlorine, sediment, VOC's, scale, minerals, and other materials. The type of filter media that can be used in the present invention will vary depending on the type of water to be treated and the various contaminants contained within the treated water.

FIG. 4 shows that the water flow is at the bottom of the water filter system 20. This is in contrast to the prior art in which water is delivered to the top of the water filter system. The delivery of water to the channel 66 adjacent the bottom 34 of the housing 20 allows water to be treated by rising, under pressure, within each of the interior passageways of the filters and then passing through the filter media toward the annulus formed between the filter and the wall of the chamber. Ultimately, when it is necessary to replace one of the filters, the flow of water through the water inlet line 32 can be blocked by valve 46 so that water flow is stopped. The dust cover 28 can be removed so as to expose the outer cap 106. The outer cap 106, as will be described hereinafter, has a pressure relief valve 110 that can be pressed so as to release air pressure from the interior of the housing 22. This allows the outer cap 106 to be rotated and removed. Access to the filter within the housing 22 can then be achieved. The valve 42 can then be rotated so as to allow water to drain from the interior of the housing 22. This reduces the weight of water in the filter by draining water from the filter. As such, the filter can be easily lifted from the housing 22 with minimal effort. Unlike the prior art, the filter will not contain the weight of water therein. Additionally, since water is drained from the system prior to the removal of the filter, there is less chance for spillage of water during the removal of the filters, the installation of new filters, or the installation of replacement filters.

After the filter is replaced, it is only necessary to install the filter within the respective chamber such that the tubular member at the bottom cap thereof enters the receptacle at the bottom of the housing 22 so that the tubular member opens to the channel 66. As will be described hereinafter, the tubular member includes O-ring seals so as to assure a watertight relationship between the tubular member and the surfaces at the bottom of the housing. After installation, the outer cap 106 can be suitably installed, pressed down, and rotated so as to engage with surfaces (to be described hereinafter) on the cover member 24. As such, a liquid tight sealing relationship is established between the outer cap 106 and the housing 22. The system is then available for operation. The valve 46 can be rotated so as to allow water to flow from the water inlet line toward the channel 66. The valve 42 can be rotated so as to allow water to be blocked from entering the discharge line 94 and enter the water outlet line 36. As such, water will flow, under pressure, throughout the water filter system 20 of the present invention.

Figure 5:
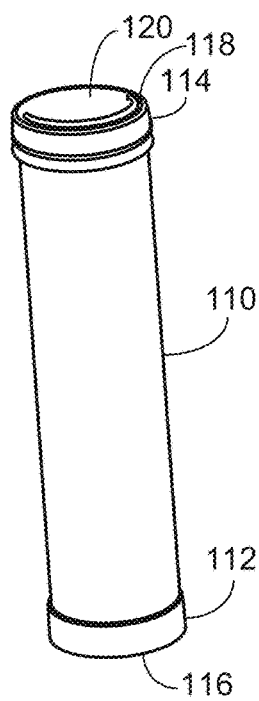
FIG. 5 is an upper perspective view of the filter as used in the water filter system of the present invention and showing the handle in a stowed position.

FIG. 5 is an isolated illustration of a single filter 110. Filter 110 has a bottom cap 112 and a top cap 114 thereon. Bottom cap 122 will have tubular member 116 extending downwardly therefrom. A handle 118 is illustrated as hingedly mounted to the top surface 120 of the top cap 114. The handle 118 is illustrated in its stowed position in which it lays flat on to the top surface 120.

Figure 6:
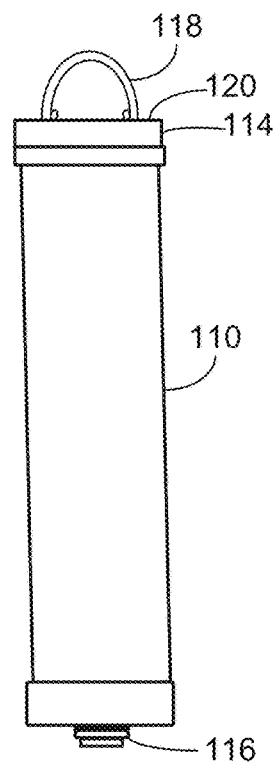
FIG. 6 is a side elevational view of the filter as used in the present invention with the handle in a deployed position.

FIG. 6 shows the filter 110 with the handle 118 deployed. Handle 118 extends outwardly from the top surface 120 of the top cap 114. This allows a user to grab the handle 118 and to easily lift the filter 110 from its position within respective chamber of the housing. The tubular member 116 is illustrated as having O-ring seals applied around a circumference thereof.

Figure 7:
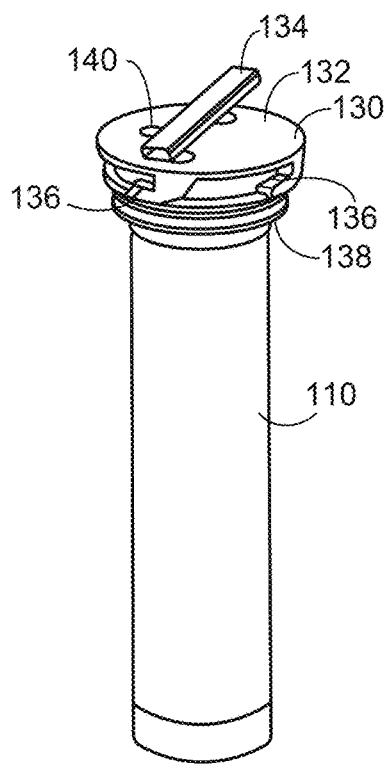
FIG. 7 is an upper perspective view showing the filter with an outer cap applied to an upper end thereof.

FIG. 7 illustrates the filter 110 as having the outer cap 130 applied thereto. Outer cap 130 has a top surface 132 with a handle 134 extending outwardly therefrom. Handle 134 has a length greater than an outer diameter of the top surface 132 of the outer cap 130. Importantly, the outer cap 130 includes arms 136 that are arranged below the top surface 132. Arms 136 (as will be described hereinafter) are engageable with ramps formed on the cavities of the cover member 24. The top 130 also includes a pair of O-ring elastomeric seals 138. Seals 138 will establish a liquid-tight relationship between the filter 110 and the interior surfaces of the respective chambers of the housing. The top surface 132 of the outer cap 130 will also include a pressure relief valve 140 thereon. Pressure relief valve 140 is described hereinafter in association with the teachings of FIG. 12.

Figure 8:
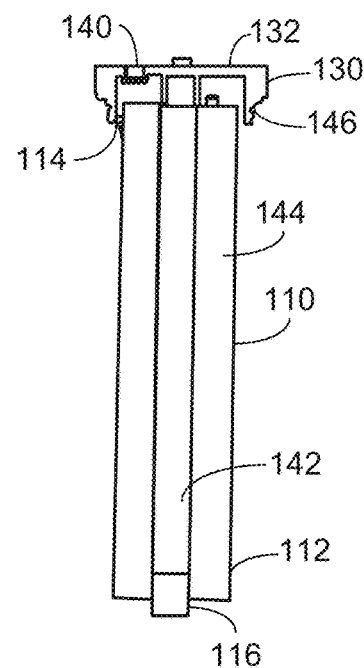
FIG. 8 is a cross-sectional view of FIG. 7 showing, in particular, the outer cap applied over the top cap of the filter of the present invention.

FIG. 8 illustrates a cross-sectional view of the filter 110 and the outer cap 130. It can be seen that the outer cap 130 extends over the top cap 114 of filter 110. The bottom cap 112 has the tubular member 116 extending downwardly therefrom. Tubular member 116 opens to the interior passageway 142 within the filter 110. The filter media 144 surrounds the interior passageway 142.

The outer cap 130 is secured over the top cap 114. Top cap 130 is intended to provide an air-tight seal with the surfaces of the chamber and cavity on the interior of the housing. Outer cap 130 includes notches 146 extending circumferentially therearound. These notches 146 serve to receive elastomeric O-rings thereon. The pressure relief valve 140 is illustrated as extending downwardly from the top surface 132 of the outer cap 130.

Figure 9:
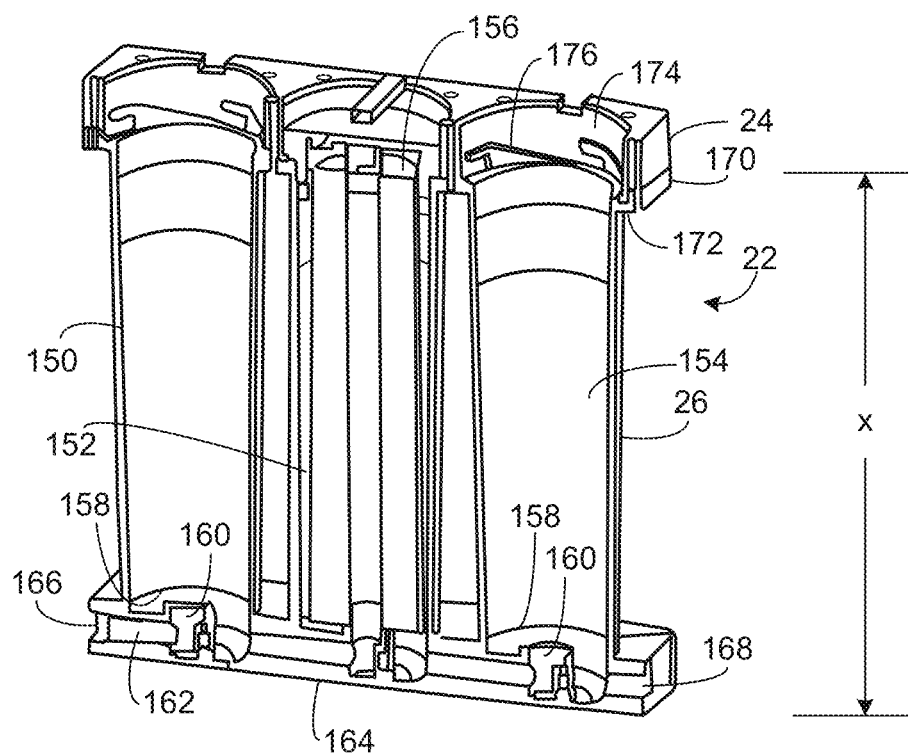
FIG. 9 is a cross-sectional view showing the interior of the housing of the filter system of the present invention.

FIG. 9 shows the housing 22 and, in particular, shows the monoblock body 26 and the cover member 24. Since the body 26 is of a monoblock construction, all of the surfaces on the interior of this body 26 are integrally formed together. FIG. 9 shows that there is a first chamber 150, a second chamber 152 and a third chamber 154. A filter 156 is illustrated as positioned within the second chamber 152. Each of the chambers 150, 152 and 154 has a cylindrical shape. The bottom 158 of each of the chambers 150, 152 and 154 is generally flat with an opening 160. Opening 160 is arranged so as to accommodate the tubular member associated with the bottom cap of the filter. This opening 160 will communicate with the channel 162 located adjacent to the bottom 164 of the body 26. Ultimately, the blocking elements (such as blocking elements shown in FIG. 4) can be manually installed within the channel 162 so as to direct fluid flow as desired. The channel 162 has one end 166 that will connect to the water inlet line 32 and an outlet 168 that will have the valve installed therein and will connect with the water outlet line 36.

Importantly, the body 26 of housing 22 is that portion illustrated by line "X" in FIG. 9. This body 26 is integrally molded together. As such, this molding process creates a first chamber, 150, second chamber 152 and a third chamber 154. The channel 162 is also formed adjacent to the bottom 164 of the body 26. The structure can be formed of a polymeric material. As such, the body 26 can be relatively inexpensive. Furthermore, since this is a "monoblock", it is assured that each of the chambers is positioned in exactly the same position in each monoblock body. Similarly, the channel 162 will connect with each of the chambers in exactly the same way for each monoblock body that is produced. As such, the monoblock body of the present invention overcomes those in accuracies and problems associated with attempting to connect filters together. It is assured that each of the filters that is received within the chambers 150, 152 and 154 is positioned in exactly the precise location for installation and removal purposes. The body 26 avoids unnecessary manipulation of each of the filters.

The cover member 24 is particularly unique in the present invention. Cover member 24 can be fixedly secured to the top 170 of the body 26. This can be done by screws or other types of fasteners. Ultimately, it is important to establish an air-tight fit between the cover member 24 and the body 26. As such, large elastomeric seals 172 can be employed in the top surface 170 of the body 26 or on the bottom surface of the cover member 24. As such, as the fasteners tighten the cover member 24 to the body 26, the corresponding bottom and top surfaces of the cover member 24 and the body 26 will compress the seals 172 so as to establish the liquid-tight relationship therewith.

FIG. 9 shows that the cover member 26 has a cavity 174 formed therein. Ramps 176 are formed on the inner wall of the cavity 174. Ramps 176 receive the arms associated with the outer cap. This relationship will be described hereinafter.

Figure 10:
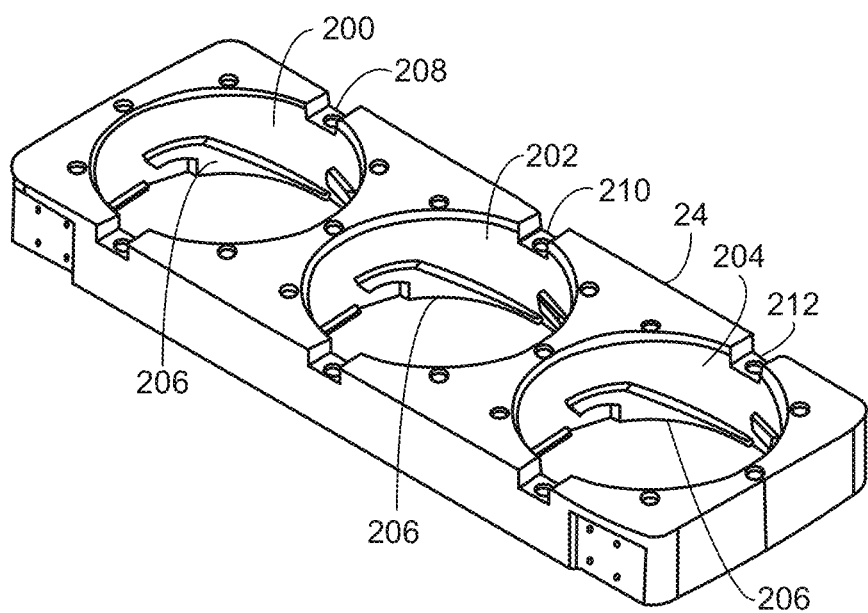
FIG. 10 is an upper perspective view of the cover member as separated from the housing of the water filter system of the present invention.

FIG. 10 is an isolated view of the cover member 24. Cover member 24 is illustrated as having cavities 200, 202 and 204 formed therein. Each of the covers 200, 202 and 204 will include ramps 206 arranged in spaced relationship to each other. Ideally, in the preferred embodiment the present invention, there will be four such ramps positioned in each of the cavities 200, 202 and 204. However, it is believed that fewer or more ramps can be utilized in order to create the desired air-tight sealing relationships desired by the present invention. The cover member 24 includes respective slots 208, 210 and 212 which extend diametrically across the diameter of each of the cavities 200, 202 and 204, respectively. The slots 208, 210 and 212 will accommodate the outer portions of the handles associated with the outer caps so as to affix the position of the outer caps and to assure that the air-tight relationship between the outer caps and the walls of the cavity is achieved.

Figure 11:
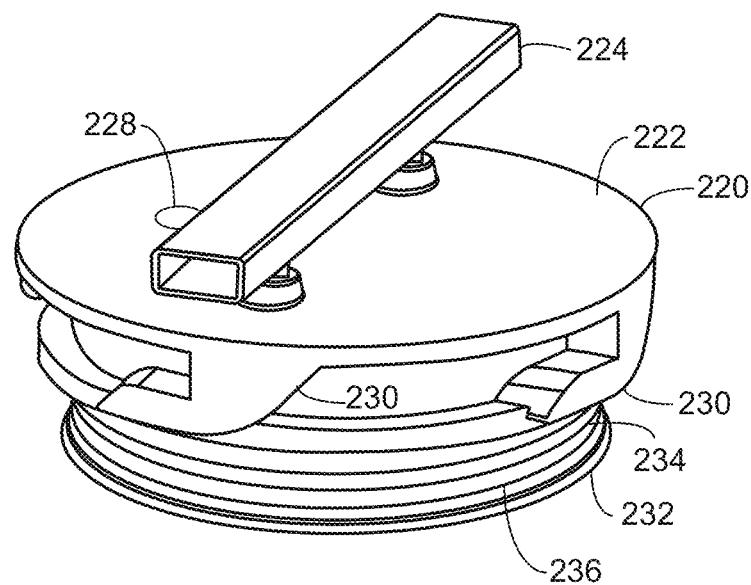
FIG. 11 is an upper perspective view of the outer cap as used in the water filter system of the present invention.

FIG. 11 is an isolated view of the outer cap 220. The outer cap 220 has a top surface 222 with the handle 224 extending diametrically thereacross. Handle 224 is has a bottom surface 226 slightly spaced from the top surface 222. The top surface 222 has the pressure relief valve 228 positioned thereon. The outer cap 220 includes four arms 230 arranged around the circumference of the outer cap 220. There is a cylindrical portion 232 that extends downwardly below the arms 230. The cylindrical portion 232 is designed so as to accommodate O-ring seals in the respective slots 234 and 236 thereof.

In normal use, when it is desired to remove a filter from the assembly, the handle 224 is pressed down and rotated so as to separate the arm 230 from the slot of the respective ramp 206. This rotation is carried out until the arms 230 are free of the slots of the ramp 206. As such, the handle 224 can be suitably grasped and lifted so that the cylindrical portion 232 can be separated from the cavity and/or chamber. Importantly, before this procedure is carried out, the pressure relief valve 228 should be pressed so as to remove all air pressure from the interior of the water filter system.

After a filter is installed, the outer cap 220 can be installed by placing the cylindrical member 232 within the cavity of the cover member 24. The user turns the handle 224 until the cylindrical member 232, along with its O-ring seals 234 and 236, engage in air-tight relationship with the walls of the respective cavity. The handle 224 is then rotated so that each of the arms 230 engages with the slot of the respective ramps 206. This rotation is carried out until the handle 224 aligns with the slots on the cover member 24. This will assure that the proper rotation has been carried out and that a complete seal is established.

Importantly, unlike prior art systems, the present invention establishes a radial sealing force against the walls of the cavities. As the O-ring seals on the cylindrical portion are compressed, the seal is created easily and automatically. This is in contrast to the prior art where the continual rotation of threads, along with a torquing wrench, is required so as to effectively vertically compress each of the seals located at the bottom. As such, unlike the prior art, the present invention is able to establish a proper sealing relationship between the outer cap and the walls of the cavity with a one-quarter turn in contrast to the multiple turns with great force required by the prior art. The present invention always assures that the outer cap is in place and that the seals are properly established by the relationship between the handle 224 and the respective slots of the cover member 24.

Figure 12:
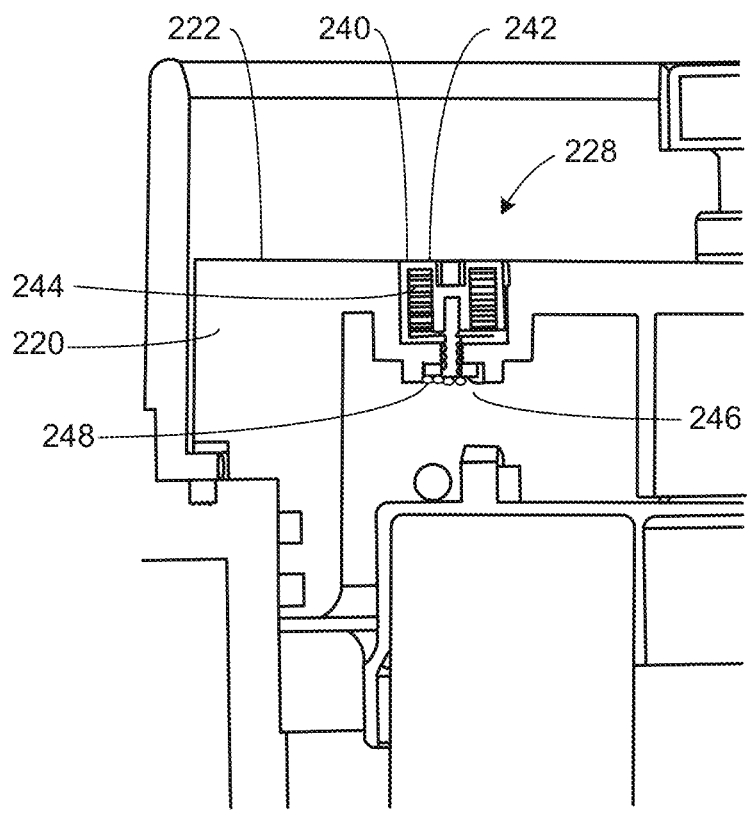
FIG. 12 is a cross-sectional detailed view of the pressure relief valve as used in the outer cap of the water filter system of the present invention.
Figure 13:
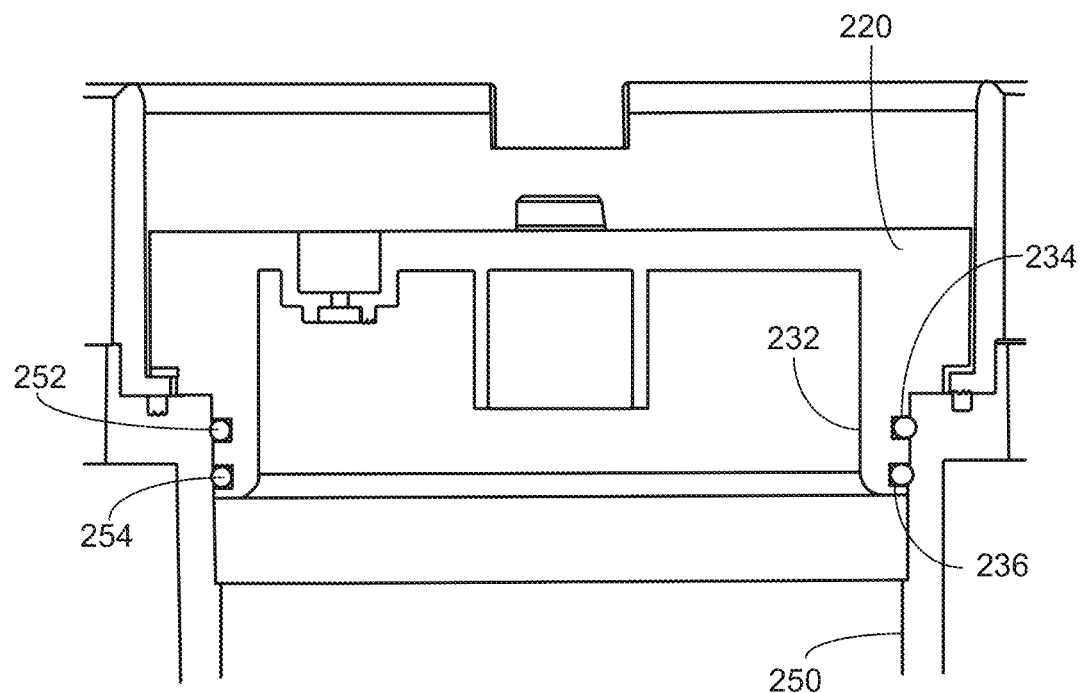
FIG. 13 is a cross-sectional view showing the placement of the outer cap over the filter and within the chamber.

FIG. 13 illustrates the configuration of the pressure relief valve 228 of the present invention. It can be seen that the pressure relief valve 228 is received within slot 240 formed into the outer cap 220. Slot 240 opens to the top surface 222 of the top cap 220. The pressure relief valve 228 has a button 242 positioned at the top surface 222 of the outer cap 220. A spring 244 urges against the underside of the button 242. The outer cap 220 also has a valve member 246 slidably positioned therein. The button 242 is depressable so as to overcome a resistance of the spring 244 such that the underside of the button 242 urges against the valve member 246 in order to move the valve member 246 to release pressure from an interior of the housing. FIG. 12 shows the valve member 246 in its air-tight position seated within a notch 248 formed at the bottom of the outer cap 220.

FIG. 13 shows how the outer cap 220 is properly seated within the chamber 250. As can be seen, the outer cap 220 includes the cylindrical portion 232 that is in close fitting relationship with the inner wall of the chamber 250. Notches 234 and 236 open to the wall of the chamber 250. The respective notches 234 and 236 receive O-ring seals 252 and 254 therein. O-ring seals 252 and 254 will be suitably compressed so as to establish an air-tight and liquid-tight relationship with the wall of the chamber 250. This tight sealing relationship is established by the rotation of the outer 230 in the manner described herein previously.

Figure 14:
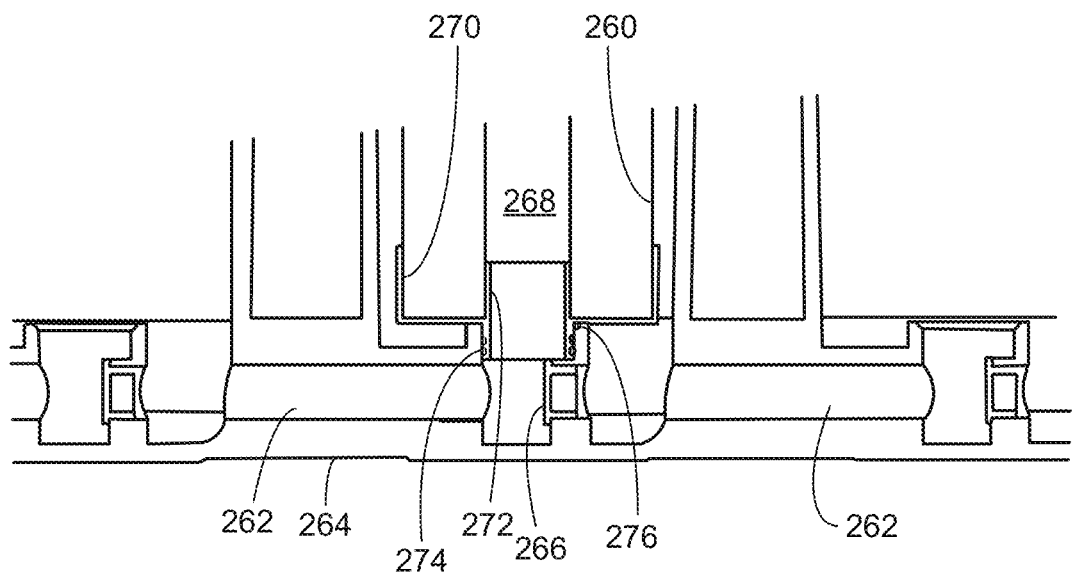
FIG. 14 is a cross-sectional view showing the tubular member of the filter as received within a receptacle adjacent to the channel of the water filter system of the present invention.

FIG. 14 is a close-up illustration of how the filter 260 is engaged with the channel 262 located adjacent to the bottom 264 of the housing. In particular, channel 262 extends longitudinally through the interior of the monoblock of the body of the housing. Blocking element 266 is positioned so that water passing through the channel 262 is directed upwardly into the interior passageway 268 of the filter 260. The bottom cap 270 as positioned at the bottom of the filter 260. Bottom cap 270 includes the tubular member 272 which is positioned within the interior passageway 268 and also opens to the channel 262.

Importantly, it is important to establish a close sealing relationship between the outer wall 274 and the inner wall adjacent the channel 262. The can be seen in FIG. 14 that there are a pair of O-ring seals that can be applied over the outer diameter of the tubular member 270 for the outwardly extending portion of the tubular member 272. There is a funnel member 276 that is tapered so as to direct the outwardly extending portion of the tubular member 272 toward its seated location adjacent the channel 262. For installation purposes, it is only necessary for the installer to direct the outwardly extending portion of the tubular member 272 toward the bottom of the housing. The outwardly extending portion of the tubular member 272 can be manipulated so as to enter the interior by being guided by the funnel member 276. As such, a downward force can be applied to the top of the filter 260 so as to properly seat the filter 260 in its location adjacent to the channel 262.

Figure 15:
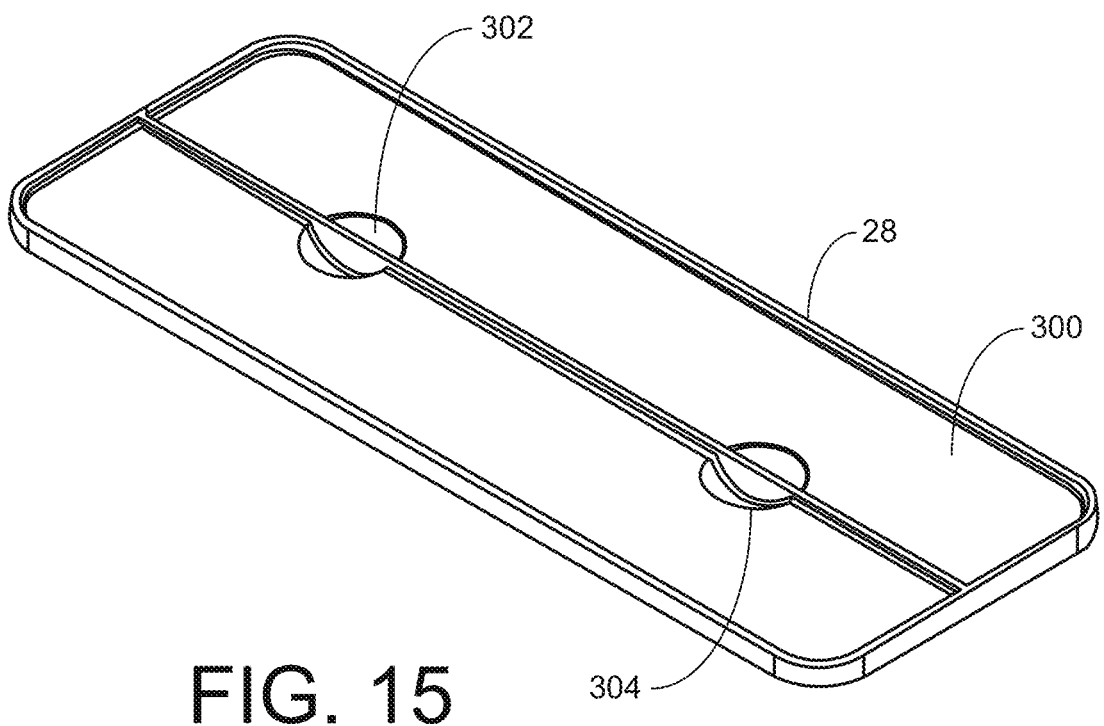
FIG. 15 is an upper perspective view of the dust cover as utilized on the water filter system of the present invention.

FIG. 15 shows an exterior view of the dust cover 28. Dust cover 28 includes a planar surface 300 that extends for substantially over the top of the housing 22. The surface can include openings 302 and 304 to allow a user to grasp the dust cover 28 for the purposes of removal. Suitable hinged handles can be employed within these areas 302 and 304 so as to allow a further enhanced ability to lift the dust cover 28.

Figure 16:
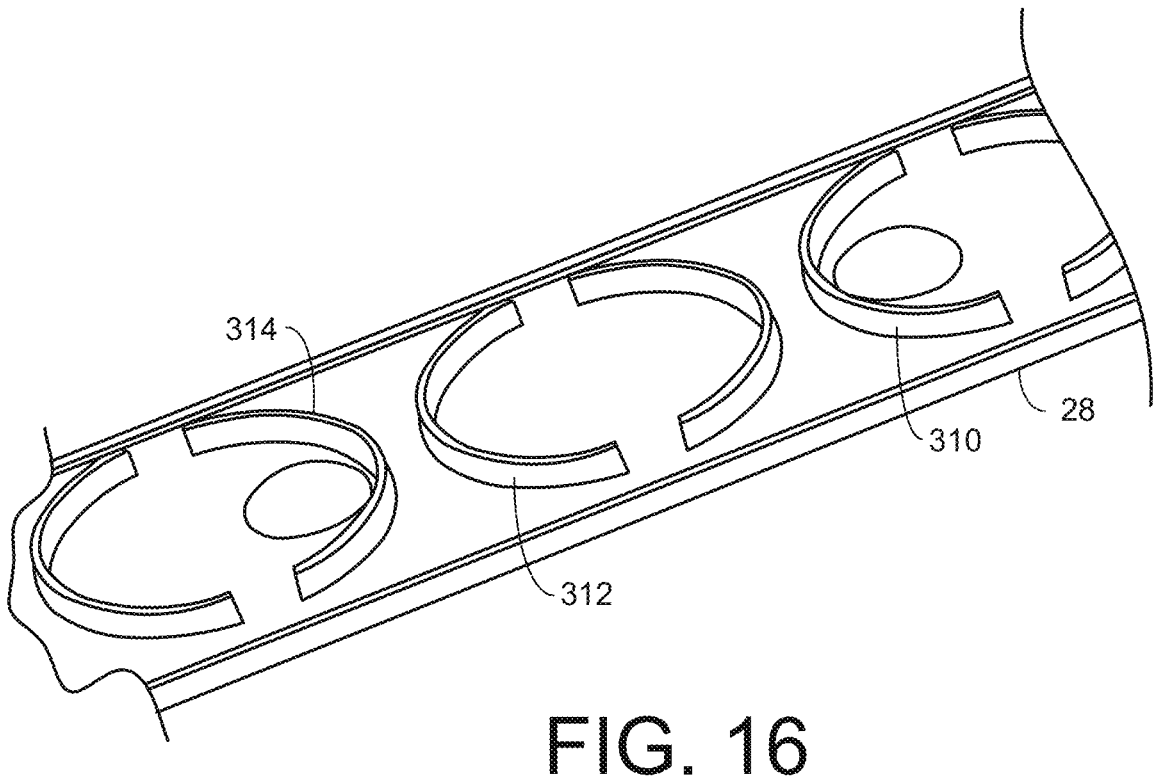
FIG. 16 is a perspective bottom view of the dust cover as used in the water filter system of the present invention.

FIG. 16 shows the bottom of the dust cover 28. It can be seen that the dust cover 28 includes three split circular areas 310, 312 and 314. The split circular areas can be inserted within the upper portions of the cavities of the cover member 24 when the dust cover 28 is installed. As such, these split circular areas 310, 312 and 314 can be properly seated so as to assure a proper covering of each of the cavities and to prevent the intrusion of contaminating elements therein.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A water filter system comprising:
  a housing having a channel formed adjacent a bottom thereof, the channel adapted to be connected with a water inlet line, said housing having at least one chamber therein, the channel adapted to connect with a water outlet line, said housing having a cavity formed at an upper end of the at least one chamber;
  at least one filter removably received in the at least one chamber, said at least one filter being in communication with the channel at the bottom thereof, the at least one filter and an inner wall of the at least one chamber defining an annulus therebetween, the at least one filter having an interior passageway that opens to a filter media, the filter media being disposed such that water flows from the channel and into the interior passageway and through the filter media and into the annulus, the annulus communicating with the channel; and
  an outer cap releasably affixed within the cavity, said outer cap covering an upper end of said at least one filter, said housing having a cover member affixed thereto, the cover member having the cavity formed therein, said outer cap being rotatable between an open position and a locked position, the cover member having a pair of slots formed at or adjacent to a top surface thereof, said outer cap having a handle having a length dimension extending for a distance greater than a diameter of the cavity so as to have opposite ends thereof protruding outwardly beyond an outer diameter of said outer cap, the handle having the opposite ends respectively received in the pair of slots when the outer cap is in the locked position.

* * * * *